Figure 1:
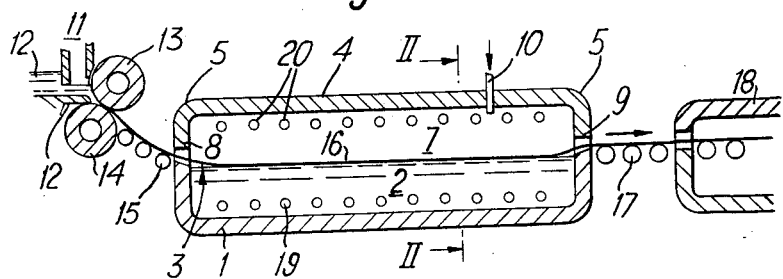

Sept. 14, 1965   L. A. B. PILKINGTON ETAL   3,206,292
METHOD AND APPARATUS FOR THE MANUFACTURE OF FLAT GLASS
Original Filed Dec. 6, 1954

Inventors
L. A. B. Pilkington
K. Bickerstaff
By
Attorney

United States Patent Office 3,206,292
Patented Sept. 14, 1965

3,206,292
METHOD AND APPARATUS FOR THE MANUFACTURE OF FLAT GLASS
Lionel A. B. Pilkington, Rainhill, and Kenneth Bickerstaff, St. Helens, England, assignors to Pilkington Brothers Limited, Liverpool, England, a British company
Original application Dec. 6, 1954, Ser. No. 473,358, now Patent No. 2,911,759, dated Nov. 10, 1959. Divided and this application Nov. 9, 1959, Ser. No. 851,619
Claims priority, application Great Britain, Dec. 10, 1953, 34,469/53
5 Claims. (Cl. 65—65)

This application is a division of our copending application, Serial No. 473,358, filed December 6, 1954, now Patent No. 2,911,759.

This invention relates to the manufacture of flat glass by casting on a roller in continuous ribbon form.

In the manufacture of casting flat glass in continuous ribbon form a usual practice is to flow the molten glass from a spout of a tank furnace, in which the glass batch is melted, to the pass between sizing rolls, the lower of which constitutes a casting roll, which rolls are driven at a peripheral speed which is substantially the same as the speed of the ribbon of glass which emerges from the rolls. These rolls are of greater length than the width of the ribbon and as the molten glass passes between them, they squash it to form a ribbon of the desired thickness. The rolls are mounted for mutual adjustment to regulate the distance between their peripheries, which distance determines the thickness of the ribbon emerging from the rolls. This operation is sometimes referred to as "sizing."

The ribbon is usually supported immediately after formation by a metal apron, or by a series of rollers, which directs the ribbon to a lehr in which the glass is annealed and thereby conditioned for presentation, in a continuous process, to grinders, and sometimes to mechanical polishers which operate on the glass after the grinding stages have been completed. To make the glass transparent, both faces must be ground and polished.

Another method of manufacturing a sized ribbon of flat glass has been proposed in United States specification No. 2,826,005 by applying the compressive force derived from the sizing rolls through a heat insulating gaseous layer whereby the thickness desired for the ribbon is obtained, and a fire polish condition produced.

In this prior specification reference is made to the formation of one or both of the casting rolls of permeable metal or refractory material, as for example, graphite, and as having end walls and means for introducing into the interior of the roll or rolls a gas under such conditions that the gas will percolate through the roll wall.

In the said prior specification, reference is also made to the driving of casting rolls at a high speed so that a clinging film of air is entrained on the surface of each roll, the linear speed of the surface of such a roll being of the order of three thousand inches per minute.

A main object of the present invention is to improve the manufacture of flat glass, especially rolled glass, in continuous ribbon form so that a better surface and flatness are obtained for the glass before annealing than have heretofore been achieved at such stage of production.

A method of manufacturing flat glass in ribbon form, according to the present invention, comprises the steps of forming a ribbon of glass to definite dimensions of width and thickness, cooling the ribbon to an extent sufficient to make it stiff enough to stabilize its dimensions, thereafter directing the stiffened ribbon onto a bath of molten metal to further cool the ribbon, floating the ribbon thereon and advancing the ribbon horizontally in continuous form along the bath of molten metal, the surface of said molten metal being wider than the width of the ribbon, and while said ribbon is being advanced along said bath protecting the surface of the molten metal in the bath beyond the margins of said ribbon against oxidation, while regulating the temperature of the molten metal in the bath to continuously cool the ribbon on the bath by heat exchange therewith until it is sufficiently cooled to permit the ribbon to be led from the bath to a lehr by mechanical conveying means without becoming damaged.

In constituting the molten bath used for methods of operation according to the present invention, the following characteristics for the bath must be observed:

(1) Melting point below 700° C. approximately.
(2) Metal must be denser than glass.
(3) Metal must not stick to glass or react chemically with it to any great extent.

Obviously the metal used in the bath must be substantially inert with respect to the material from which the confining tank is made and substantially inert to the atmosphere above the bath and in any case, must be substantially incapable of forming reaction products which would adversely affect the quality of the glass.

Experiments have shown that of the common pure metals, tin fulfills all the requirements for the bath. Owing to the high cost of tin, other metals and alloys may be contemplated for reasons of economy. Lead, for instance, fulfills the above requirement but has the disadvantage that in spite of its cheapness, it necessitates a plant for disposing of any toxic fumes which might be generated at the temperatures at which the methods of operation herein described are carried out.

As an alternative to using a pure metal, e.g. tin, an alloy for example of tin and lead, may be employed, the alloy used having a specific gravity such that a ribbon of glass passing across the bath so constituted is in a buoyant state, the alloy being inert with respect to the glass.

By such method of operation, the stiffening of the ribbon of glass is effected whilst the glass is floating on the smooth support constituted by the molten metal and uniformity of cooling is achieved.

The ribbon is advantageously produced between sizing rolls and the rolled ribbon floated along the bath of molten metal.

Although the invention is of special advantage in producing a rolled ribbon of flat glass in the customary manner by sizing rolls, a ribbon of glass to be treated in accordance with the present invention may be produced as described in United States specification No. 2,826,868, i.e. by flowing molten glass from a spout of a glass melting furnace on to a casting roll on which the ribbon is first formed, co-operating rollers being disposed to engage and grip the margins of the ribbon on the casting roll in order to chill the marginal edges of the ribbon produced, and thereby positively define the actual width of the ribbon and to drive forward the ribbon.

Further, the control of the formation of the margins of the ribbon, however produced, may be assisted by locating coolers in the bath to each side thereof, or above the bath to each side of the ribbon.

The present invention also comprehends apparatus for producing flat glass, comprising means for progressively forming a ribbon of glass to define stabilized dimensions of width and thickness, a tank containing a bath of molten metal disposed to receive and float the stiffened ribbon as it is advanced from said forming means, said stiffened ribbon being adapted to move along said bath from an inlet end to an outlet end, and means for regulating the temperature of the bath to continue the cooling of the stiffened ribbon as it moves along said bath until it is sufficiently cooled before leaving the bath to permit the ribbon to be discharged from the bath to a lehr without damage.

In a preferred construction according to the present invention the apparatus for continuously producing flat glass in ribbon form comprises a tunnel bridging the bath, the tunnel including end walls and side walls to enclose the headspace over the bath of molten metal, as hereinafter more fully described, duct means for admitting a non-oxidizing gas to the tunnel, and means for regulating the temperature of the gas within the tunnel to correspond with the regulation of the temperature of the bath.

From another aspect the present invention comprises apparatus for producing flat glass comprising sizing rolls defining therebetween a pass through which molten glass is continuously delivered to form continuously a continuous ribbon of definite dimensions of width and thickness and made stable by cooling it sufficiently to make it stiff enough to retain its dimensions, said ribbon being continuously advanced longitudinally from said rolls and by said rolls as it is formed by said rolls, a tank located forwardly of said rolls in position to receieve the stiffened ribbon as it is advanced from said rolls, said tank containing a bath of molten metal with a specific gravity greater than that of the ribbon to float the ribbon therein delivered to said tank, means for controlling the temperature of the bath throughout its length to continuously cool the buoyant ribbon by heat exchange therewith as it is advanced until the ribbon is sufficiently cooled before it leaves the tank to permit said ribbon to be discharged from said tank without damage, and mechanical conveying means for the ribbon at the outlet end of the tank.

In preferred constructions according to the invention the molten bath is constituted by molten tin or an alloy in which tin predominates, said alloy in a molten state having a specific gravity which is higher than that of the glass.

Figure 2:
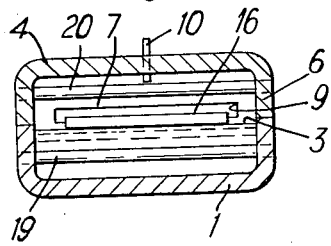
Figure 3:
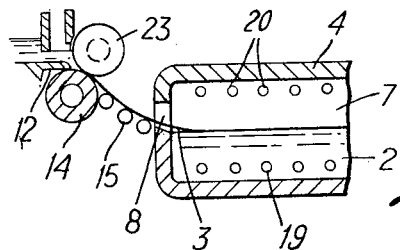

In order that the invention may be more clearly understood, some preferred embodiments thereof will now be described with reference to the accompanying drawing, in which:

FIGURE 1 is a diagrammatic sectional elevation illustrating the principle of the invention, FIGURE 2 is a cross-section taken on the line II—II of FIGURE 1, and FIGURE 3 is a fragmentary view similar to FIGURE 1, illustrating modified means of feeding the ribbon to the tank.

Referring first to FIGURES 1 and 2 of the drawings.

The tank 1 contains a bath 2 of molten tin, the level of which is indicated at 3, and the tank is provided with a roof 4 having end walls 5 and side walls 6 (see FIGURE 2), so that the roof structure provides a tunnel over the tank confining a headspace 7 over the molten bath.

The end walls 5 of the roof structure are so disposed with respect to the corresponding walls of the tank as to provide a narrow inlet 8 and a narrow outlet 9, the roof structure being provided with ducting indicated at 10 through which non-oxidising gas is continuously fed into the headspace above the bath. The purpose of maintaining the gas in the headspace is to protect the surface of the molten tin against oxidation, and to this end a reducing gas such as ordinary mains gas may be supplied through the duct, and to prevent the ingress of atmospheric air a slight plenum is preferably maintained in the headspace 7. Thereby the presence of contaminants for the glass at the interface between the glass and the bath are practically eliminated.

In the drawings, the ribbon forming means is generally indicated at 11, and comprises a customary spout 12 of a melting furnace (not shown) and upper and lower sizing rolls 13, 14 respectively, the lower of which constitutes a casting roll, between which rolls the ribbon is formed and driven forwardly by them. Between the rolls 13, 14 and the inlet 8 of the tank are supporting rollers indicated at 15 disposed to lead a ribbon 16 of glass as it is advanced from the lower roll through the inlet 8 on to the bath 2. As well known in the art an apron (not shown) may be substituted for the rollers 15.

At the exit end of the tank and in juxta-position to the base of the outlet 9 are a series of rollers 17 of customary form which lead the stiffened ribbon to a lehr 18.

As the ribbon leaves the casting roll and during its advance to the tank, it is sufficiently surface cooled to stabilize the dimensions given to the ribbon as it is formed.

The tank 1 and the roof structure are each provided with cooling means 19, 20 respectively in the form of conduits, for passing a cooling fluid through the bath and the headspace, with the object of maintaining the bath and the atmosphere over the bath at a temperature which will continue the cooling of the ribbon and eventually chill the ribbon, before it leaves the bath, to an extent such that the ribbon is sufficiently stiffened to be led out of the outlet 9 on to the usual supporting rollers 17 at the entry end of the lehr and thence into the lehr, without harming the glass.

As clearly shown in FIGURE 2, the tank and the outlet 9 are wider than the ribbon so as to avoid contact of the ribbon with either the walls of the tank or the outlet from the tank.

By such form of apparatus, a smooth substantially frictionless vehicle is provided which supports the glass ribbon 16 from the moment it leaves the supporting rollers 15 at the inlet end of the bath up to the time it is carried by the rollers 17 at the discharge end.

Instead of employing customary ribbon forming means as already described, the ribbon may be produced by flowing the molten glass from a spout 12 on to a casting roll 14, associated with edge rolls 23 for the ribbon (see FIGURE 3), as fully described in United States Patent No. 2,826,868 so that the ribbon formed on the casting roll is engaged by the edge rolls 23 whereby the marginal zones are immediately chilled and the ribbon driven forwardly by the edge rolls over the rollers 15 (or an apron as the case may be) towards the tank.

The association of the bath of molten metal with ribbon forming means which produce a ribbon of predetermined dimensions ensures a uniform cooling of the ribbon, thereby facilitating the annealing of the ribbon, during its passage through the lehr. Moreover cockling of slow setting glass during cooling is avoided.

Accordingly by the present invention rolled flat glass is uniformly and progressively cooled as it is advanced and can be produced at a greater rate than has heretofore been achieved, within the limit imposed by the viscosity of the glass in the ribbon as it is formed and the avoidance of any tendency for the ribbon to wrap itself about the casting roll on which it is formed, because of the absence of frictional resistance to the advance of the flat glass from the sizing rolls. Moreover, because of the frictionless surface on which the ribbon of glass is supported and freedom of the ribbon from contact with the tank walls, the ribbon can easily be steered in the intended path of travel symmetrically of the outlet from the bath.

Further by associating the bath of molten metal with sizing rolls, in accordance with the invention, the production of a ribbon of glass of slow-setting composition can be readily accomplished because of the absence of the frictional resistance to the advance of the ribbon towards the lehr.

We claim:

1. A method of manufacturing flat glass in ribbon form comprising the steps of rolling from molten glass a ribbon of glass to definite dimensions of width and thickness, advancing the ribbon as it is formed and further cooling the ribbon to an extent sufficient to make the ribbon stiff enough to stabilize its dimensions, and thereafter directing the stiffened ribbon to the surface of a bath of molten metal, floating the ribbon along the bath, and regulating the temperature of the molten bath to maintain a decreasing temperature gradient in the direction of advance of the ribbon along the bath so that nowhere is the temperature higher than the temperature of the ribbon surface contacting the bath so as thereby to progressively continue the cooling of the stiffened ribbon while on the bath until it is sufficiently cooled to be advanced from the bath by mechanical conveying means without becoming damaged.

2. A continuous method of manufacturing flat glass in ribbon form, comprising the steps of flowing molten glass onto a driven casting roll and thereby forming a ribbon of glass of definite dimensions of width and thickness, cooling the cast ribbon to make it stiff enough to stabilize its dimensions, immediately thereafter directing the cooled ribbon onto a bath of molten metal, floating the ribbon thereon and advancing the ribbon horizontally in continuous form along the bath of molten metal, the surface width of said bath being greater than the width of the ribbon, and while said ribbon is being advanced along said bath protecting the surface of the molten metal in the bath beyond the margins of said ribbon against oxidation, and regulating the temperature of the molten metal in the bath to maintain a decreasing temperature gradient in the direction of advance of the ribbon along the bath so that nowhere is the temperature higher than the temperature of the ribbon surface contacting the bath, thereby progressively cooling the ribbon as it is advanced by heat exchange with the bath until the ribbon is sufficiently cooled to permit it to be led from the bath by mechanical conveying means without becoming damaged.

3. Apparatus for continuously producing flat glass comprising a melting furnace including a discharge outlet for the molten glass from the furnace, a rotatably driven casting roll in operative association with the discharge outlet, and means for regulating the flow of molten glass onto the casting roll whereby a ribbon of glass of definite dimensions of width and thickness is produced from the molten glass delivered to the casting roll, means for stabilizing the dimensions imparted to the ribbon during casting, a tank containing a bath of molten metal disposed in advance of the casting roll in the direction of advance of the ribbon therefrom, said tank being disposed to receive and float the ribbon as it is advanced from said casting roll, a roof structure over the tank defining a head space over the bath, said roof structure comprising end walls extending upwardly from the tank end walls and a roof connecting the end walls, said end walls providing a narrow inlet to the tank for the preformed ribbon and a narrow outlet from the tank for the ribbon, duct means through the roof structure for maintaining a plenum of a protective atmosphere in the head space, said preformed ribbon being adapted to float along said bath from the inlet to the outlet of the tank, and temperature regulating means to maintain in the bath a decreasing temperature gradient in the direction of advance of the ribbon along the bath so that nowhere in the bath is the temperature higher than the temperature of the ribbon surface contacting the bath, said temperature regulating means thereby causing the bath to continue the progressive cooling of the ribbon as it is floated along said bath until it is sufficiently cooled to permit it to be discharged without damage from the bath.

4. An apparatus for producing flat glass as described in claim 3, comprising the combination with the duct means for admitting a non-oxidizing gas through the roof structure to the head space over the bath, of temperature regulating means mounted on the roof structure for maintaining the gas within the roof structure at a graduated temperature to correspond with the graduated temperature of the bath.

5. An apparatus for producing flat glass comprising, in combination, a melting furnace including a discharge outlet for the molten glass from the furnace, rotatably driven sizing rolls in operative relation with the discharge outlet, said sizing rolls defining between them a pass through which molten glass is continuously delivered from the discharge outlet to enable the sizing rolls to form continuously a continuous ribbon of definite dimensions of width and thickness, means for stabilizing the dimensions imparted to the ribbon during sizing to make it stiff enough to retain its dimensions, said ribbon being continuously advanced longitudinally from said rolls and by said rolls, a tank located forwardly of said rolls in operative relation therewith to receive the stiffened ribbon as it is advanced by said rolls, said tank containing a bath of molten metal with a specific gravity greater than that of the ribbon to float the ribbon thereon, a roof structure over the tank defining a head space over the bath, said roof structure comprising apertured end walls extending upwardly from the tank walls and a roof connecting the end walls, said apertured end walls presenting a narrow inlet to the tank for the preformed ribbon leaving the casting rolls and a narrow outlet from the tank for the ribbon, duct means through the roof structure for maintaining a plenum of a protective atmosphere in the head space, temperature regulating means for maintaining in the bath a decreasing temperature gradient in the direction of advance of the ribbon along the bath so that nowhere in the bath is the temperature higher than the temperature of the ribbon surface contacting the bath, said temperature regulating means thereby causing the bath to continuously cool the buoyant ribbon as it is advanced by heat exchange therewith until it is sufficiently cooled to permit said ribbon to be discharged without damage from said tank, and mechanical conveying means disposed to receive the ribbon emerging through the said outlet from the tank.

References Cited by the Examiner
UNITED STATES PATENTS

| | | | |
|---|---|---|---|
| 789,911 | 5/05 | Hitchcock | 65—182 |
| 1,735,595 | 11/29 | Blair | 65—186 |
| 2,525,203 | 10/50 | Bostroem. | |
| 2,563,394 | 8/51 | Cadgene. | |
| 2,911,759 | 11/59 | Pilkington et al. | 65—65 |

DONALL H. SYLVESTER, *Primary Examiner.*

IVAN R. LADY, MORRIS O. WOLK, *Examiners.*